United States Patent Office 3,359,119
Patented Dec. 19, 1967

3,359,119
METHOD OF PREPARING AN AGGLOMERATED FOOD PRODUCT
Charles H. Milton, Winston-Salem, N.C., assignor to R. J. Reynolds Tobacco Company, Winston-Salem, N.C., a corporation of New Jersey
No Drawing. Filed Mar. 27, 1964, Ser. No. 355,476
3 Claims. (Cl. 99—78)

ABSTRACT OF THE DISCLOSURE

Water-dispersible or water-soluble food products useful for the preparation of carbonated drinks and containing a solid, edible acid material, such as citric acid, and a solid, edible carbonate material, such as sodium bicarbonate, said carbonate material being capable of reacting with said acid material in the presence of water to yield carbon dioxide, are prepared by fluidizing or mixing an admixture of particle-form said acid material and particle-form said carbonate material by flowing warm air upwardly through said admixture and introducing into the flow of warm air moving upwardly through the resulting fluidized admixture an atomized aqueous solution of an edible coating material, said solution serving to coat said particle-form acid and carbonate materials and to effect coagglomeration of the resulting coated particle-form acid and carbonate materials.

---

This invention relates to water-dispersible or water-soluble food products. More particularly, this invention relates to water-dispersible or water-soluble food products useful for the preparation of carbonated drinks and the like and to a method of preparing such products. Still more particularly, this invention relates to a method of preparing food compositions comprising a solid, edible acid material, such as citric acid, and a solid, edible carbonate material, such as sodium bicarbonate, said carbonate material capable of reacting with said acid material in the presence of water to yield carbon dioxide. Further, this invention relates to a method of preparing food compositions useful in the preparation of flavored drinks, such as a flavored carbonated beverage.

It is known to prepare food compositions containing a coated, solid, acid component and a coated, solid, carbonate component, the carbonate component being capable of reacting with the acid component in the presence of water to yield carbon dioxide, so that upon the addition of such compositions to water or an aqueous liquid a carbonated drink is produced. It is also known to produce an article by adhering or affixing a pressed tablet of such composition to one end of a stiffly flexible elongated member so that by inserting said one end into a body of liquid and stirring a carbonated beverage drink is produced. Methods and apparatus are also known for producing such compositions and articles, see copending, co-assigned U.S. Patent applications Ser. No. 226,010 filed Sept. 25, 1962, and now abandoned and U.S. Patent application Ser. No. 273,744 filed April 17, 1963, and now abandoned and U.S. Patents 2,648,609, 2,799,241 and 3,089,824. The disclosures and teachings of the above-identified patent applications and patents are herein incorporated and made part of this disclosure.

Heretofore in the preparation of food compositions useful for incorporation by dissolution or dispersion in an aqueous liquid, such as water, to produce a flavorful carbonated drink it has been the practice to coat the particle-form acid component, such as citric acid, with a coating material so as to protect the acid component from deterioration during processing and storage. It has also been the practice heretofore to separately coat the alkaline or carbonate component of such compositions with a coating material, desirably the same coating material employed to coat the acid component, so as to protect the carbonate component from deterioration during processing and storage. The coating material on the acid component and the carbonate component also serves to prevent direct contact between the acid component and the carbonate component during processing and storage thereby avoiding premature reaction between these components.

The separate coating operations for both the acid component and the carbonate component have increased the cost of the resulting finished product. Also, the amount of coating on both the acid component and the carbonate component had the tendency to reduce the rate of solubility of the resulting compositions in aqueous liquids, such as water.

Accordingly, it is an object of this invention to provide an improved food product or food composition capable of yielding carbonated beverage or drink upon dissolution in water and containing a solid, particle-form acid component and a solid, particle-form carbonate component capable of reaction with the acid component in the presence of water to yield carbon dioxide.

Another object of this invention is to provide an improved method for agglomerating solid, particle-form acid material and solid, particle-form carbonate material.

Still another object of this invention is to provide an edible food product capable of dissolution in water to yield a flavorful carbonated drink and exhibiting an improved rate of dissolution therein.

How these and other objects of this invention are achieved will become apparent in the light of the accompanying disclosure. In at least one embodiment of the practice of this invention at least one of the foregoing objects will be achieved.

In accordance with this invention a food product containing a solid edible acid component, such as citric acid, and a solid edible carbonate component, such as sodium bicarbonate, said carbonate component capable of reacting with the acid component in the presence of water to yield carbon dioxide, is prepared by forming an admixture containing particle-form said acid component and particle-form said carbonate component and co-agglomerating the acid component and the carbonate component of said admixture to yield a co-agglomerated product made up of said acid component and said carbonate component attached or agglomerated to each other.

The co-agglomeration operation is carried out by forming an admixture of finely divided, solid acid component, such as citric acid, and finely divided carbonate component, such as sodium bicarbonate, and aerating or fluidizing the resulting admixture by flowing a stream of air, such as warm air, preferably at a temperature not in excess of about 170° F., upwardly through said admixture. During the aerating or fluidizing operation the finely divided particle-form acid and carbonate components are thoroughly, intimately and uniformly admixed.

After the solid acid and carbonate components have been thoroughly fluidized to yield a homogeneous mass, and desirably after the resulting homogeneous mass has been increased in temperature, from about room temperature, the charge temperature prior to mixing and fluidization, to a temperature approaching the temperature of the air used to effect fluidization, such as a temperature in the range 100–170° F., an atomized solution of coating material is introduced into the flow of air during the fluidization operation. An aqueous dextrin solution, such as a solution containing 50–75% by weight dextrin, more or less, has been found to be effective for the coating solution.

The spray of coating solution thus-introduced serves to coat the surfaces of the fluidized particle-form acid and carbonate components and to deposit thereon a protective coating of dextrin. Despite the fact that water is introduced into the fluidized admixture and the acid and carbonate components of the fluidized admixture are reactive in the presence of water to produce carbon dioxide, substantially no chemical reaction between the fluidized components takes place due to the very short time involved for effecting coating of the particles with the dextrin coating solution and the subsequent drying or vaporization of water from the solution with the resulting deposition of a protective coating of dextrin on the fluidized particles.

The thus-introduced dextrin solution besides serving to deposit a protective coating of dextrin on the fluidized particle-form acid and carbonate components also serves to effect co-agglomeration of the acid and carbonate components. The dextrin-coated materials adhere or otherwise agglomerate to each other to yield agglomerates made up of dextrin-coated acid component and/or dextrin-coated carbonate component.

The coating and co-agglomeration operation is carried out for a sufficient period of time to yield a product made up of co-agglomerated acid component and carbonate component having a desired particle size range. Following the coating and co-agglomeration operation the resulting co-agglomerated product may be discharged, usually at a temperature in the range 100–110° F., more or less. When it is desired to employ the resulting coated and co-agglomerated product in tablet form it is desirable to further coat or apply to the co-agglomerated product, preferably directly subsequent to and following the coating and co-agglomeration operation, a lubricant material, such as corn oil, which may be similarly applied to the co-agglomerated product as the application of the aqueous coating solution thereto. The corn oil is particularly useful as a die lubricant to prevent die sticking or capping during the tabletting operation.

In the practice of this invention various solid edible acid materials, such as the fruit acids, may be employed. Particularly useful as the acid component of the co-agglomerated compositions of this invention are citric acid, tartaric acid, adipic acid, fumaric acid, ascorbic acid, and mixtures thereof.

As the solid edible alkaline or carbonate component reactive with the acid component in the presence of water to yield carbon dioxide, sodium bicarbonate has been found to be particularly useful.

As indicated hereinabove dextrin has been found particularly useful as the protective coating material in the production of the co-agglomerated compositions prepared in accordance with this invention. Malto-dextrin is also useful as well as mixtures of dextrin and malto-dextrin. Other edible protective coating materials are also useful. Dextrin, however, is the preferred coating material in the practice of this invention.

As a lubricant corn oil has been found to be particularly satisfactory when the co-agglomerated compositions prepared in accordance with this invention are to be tabletted.

In addition to the above components various other materials may be present in the co-agglomerated compositions. Such other materials may include sugar, such as powdered sugar or sucrose, or other solid sugars, or synthetic sweeteners, such as saccharin or a cyclamate, such as calcium cyclamate, or mixtures of sugar and a synthetic sweetener. There may be also added to the fluidized admixture undergoing co-agglomeration various dyes, food coloring agents and food flavoring agents and frothing agents and other materials useful in food products. The dyes may be added as finely divided solid particle-form material to the mixture undergoing co-agglomeration and/or dissolved in the coating solution, e.g. the dextrin solution, applied to the fluidized mixture to effect co-agglomeration.

In a typical co-agglomeration operation in accordance with this invention an admixture comprising finely divided citric acid, finely divided sodium bicarbonate together with a solid food dye and a flavoring agent, as well as a finely divided synthetic sweetener, is aerated and fluidized by flowing upwardly through the admixture a stream of warm air, such as air at a temperature of about 170° F. For the production of a batch of co-agglomerated material weighing about 8000 grams, warm air is passed upwardly through the fluidized admixture at a rate of about 60 cubic feet per minute for three minutes. Apparatus suitable for effecting such mixing and fluidization, and applicable to the practice of this invention, is illustrated in U.S. 3,089,824 referred to hereinabove.

After about three minutes a 50% dextrin solution is atomized into the fluidized admixture at a rate of about 60 cc. per minute for about 9–10 minutes while passing air through the fluidized admixture at a rate of about 80 cubic feet per minute. The introduction of the dextrin solution serves to protectively coat and to co-agglomerate the fluidized admixture. Following the introduction of the dextrin solution, corn oil is atomized into the resulting fluidized, co-agglomerated admixture at a rate of about 30 cc. per minute for three minutes while maintaining the rate of air flow at about 80 cubic feet per minute.

Following the above sequence of operations, the resulting co-agglomerated composition is discharged, usually at a temperature in the range 100–110° F. The moisture content of the discharged co-agglomerated material is desirably below about 1% by weight, usually in the range 0.3–0.8% by weight. The discharged co-agglomerated material might have a particle size distribution listed in accompanying Tables A and B.

TABLE A

| Orange flavored composition: | Percent |
|---|---|
| Retained on No. 10 screen | .5 |
| Retained on No. 14 screen | 1.0 |
| Retained on No. 20 screen | 3.0 |
| Retained on No. 28 screen | 10.0 |
| Retained on No. 40 screen | 39.0 |
| Passed through No. 40 screen | 46.5 |

TABLE B

| Cola flavored composition: | Percent |
|---|---|
| Retained on No. 10 Screen | .75 |
| Retained on No. 14 Screen | .75 |
| Retained on No. 20 Screen | 2.0 |
| Retained on No. 28 Screen | 7.50 |
| Retained on No. 40 Screen | 40.0 |
| Passed through No. 40 Screen | 49.0 |

In the preparation of compositions in accordance with this invention sodium bicarbonate having a particle size distribution such that 3% by weight is retained on a No. 28 Screen, 46% passes through a No. 28 Screen but is retained on a No. 40 Screen and 51% passes through a No. 40 Screen, has been found to be satisfactory. Also, citric acid having a particle size distribution such that 2.5% by weight is retained on a No. 28 Screen, 15% passes through a No. 28 Screen but is retained on a No. 40 Screen and 82.5% passes through a No. 40 Screen, has been found to yield satisfactory results.

The following are analyses on a percent dry weight basis of various co-agglomerated compositions prepared in accordance with this invention.

Example No. 1

Cherry flavored composition:

| | Percent by wt. |
|---|---|
| Citric acid, anhydrous, fine granular | 52.11 |
| Ascorbic acid, fine granular | .64 |
| Atlene Deep Red Shade (Kohnstamm) | .68 |
| Calcium Sucaryl | 12.30 |
| Sodium saccharin | .76 |
| Liquiritol (Penick) | .17 |
| Imitation Wild Cherry Aromalok No. 38503 (Fritzsche) | 1.23 |
| Sodium bicarbonate | 27.58 |
| Corn oil | 1.00 |
| Dextrin | 3.53 |

Example No. 2

Maple syrup composition:

| | Percent by wt. |
|---|---|
| Citric acid, anhydrous, fine granular | 36.1 |
| Imitation Butter Maple F-996/TP (Firmenich) | 4.5 |
| Brown Burnt Sugar Shade (Fritzsche) | 1.5 |
| Coating sugar | 18.8 |
| Sodium bicarbonate | 35.6 |
| Corn oil | 1.0 |
| Dextrin | 2.5 |

A composition in accordance with Example No. 1 when added in an amount of about 2.6 grams, such as a tablet weighing 2.6 grams, to water, yields a delightful, refreshing carbonated cherry-flavored drink.

An amount of a composition in accordance with Example No. 2 weighing about 1.2 grams when dissolved in 4 ounces of hot water, followed by the addition of about 1 cup of sugar, yields about 8-9 ounces of a tasteful maple-flavored syrup.

Usually, in the preparation of compositions in accordance with this invention it is desirable to incorporate both the acid component and the carbonate component in stoichiometric amounts by weight so that when the resulting composition is dissolved in water all of the acid component is neutralized by all of the carbonate component. For certain flavors, however, such as orange, it may be desirable to provide an excess of acid component so as to impart a tart acid flavor to a drink prepared therefrom. For certain other flavors, however, such as root beer, an excess of the carbonate component is desirable so as to provide a drink having an alkaline taste.

As will be apparent to those skilled in the art in the light of the foregoing disclosures, many modifications and substitutions are possible in the practice of this invention without departing from the spirit or scope thereof.

I claim:

1. A method of co-agglomerating an admixture made up of a particle-form edible acid and a particle-form edible carbonate, said carbonate being capable of reacting with said acid in the presence of water to yield carbon dioxide, which comprises mixing and fluidizing said mixture of particle-form acid and particle-form carbonate by flowing warm air upwardly therethrough and introducing into the flow of warm air moving upwardly through said mixture an atomized aqueous solution of an edible coating material, said solution serving to coat the individual particles of said acid and said carbonate and to effect co-agglomeration of the resulting coated acid and carbonate particles.

2. A method in accordance with claim 1 wherein said coating material is selected from the group consisting of dextrin, malto-dextrin and mixtures thereof.

3. A method in accordance with claim 1 wherein said edible acid is selected from the group consisting of citric acid, tartaric acid, adipic acid, fumaric acid, ascorbic acid and mixtures thereof wherein said carbonate is sodium bicarbonate and wherein said coating material is selected from the group consisting of dextrin, malto-dextrin and mixtures thereof.

References Cited

UNITED STATES PATENTS

| 3,089,824 | 5/1963 | Wurster | 118—24 |
| 3,100,909 | 8/1963 | Schapiro | 99—78 |
| 3,207,824 | 9/1965 | Wurster et al. | 99 |

OTHER REFERENCES

Little et al.: Tablet Making, 2nd ed., 1963, page 64.

HYMAN LORD, *Primary Examiner.*

A. LOUIS MONACELL, *Examiner.*

M. VOET, *Assistant Examiner.*